United States Patent
Peng et al.

(10) Patent No.: US 12,379,965 B2
(45) Date of Patent: Aug. 5, 2025

(54) DYNAMIC SAFETY AWARENESS TASK DISTRIBUTION

(71) Applicant: Intel Corporation, Santa Clara, CA (US)

(72) Inventors: Yang Peng, Munich (DE); Florian Geissler, Munich (DE); Michael Paulitsch, Ottobrunn (DE)

(73) Assignee: Intel Corporation, Santa Clara, CA (US)

( * ) Notice: Subject to any disclaimer, the term of this patent is extended or adjusted under 35 U.S.C. 154(b) by 693 days.

(21) Appl. No.: 17/556,567

(22) Filed: Dec. 20, 2021

(65) Prior Publication Data

US 2022/0114028 A1 Apr. 14, 2022

(51) Int. Cl.
*G06F 9/50* (2006.01)
*G06F 9/48* (2006.01)

(52) U.S. Cl.
CPC .......... *G06F 9/5044* (2013.01); *G06F 9/4881* (2013.01); *G06F 9/505* (2013.01); *G06F 9/5055* (2013.01); *G06F 9/5072* (2013.01); *G06F 9/5077* (2013.01)

(58) Field of Classification Search
None
See application file for complete search history.

(56) References Cited

U.S. PATENT DOCUMENTS

| 2014/0059207 A1 | 2/2014 | Gulati et al. |
| 2017/0134520 A1 | 5/2017 | Abbasi et al. |

FOREIGN PATENT DOCUMENTS

| CN | 111421554 | 5/2021 |

OTHER PUBLICATIONS

"European Application Serial No. 22210781.5, Communication Pursuant to Rule 69 EPC mailed Jun. 26, 2023", 2 pgs.
"European Application Serial No. 22210781.5, Response filed Sep. 29, 2023 to Communication Pursuant to Rule 69 EPC mailed Jun. 26, 2023", 14 pgs.
"European Application Serial No. 22210781.5, Extended European Search Report mailed May 2, 2023", 9 pgs.

*Primary Examiner* — Qing Yuan Wu
(74) *Attorney, Agent, or Firm* — Schwegman Lundberg & Woessner, P.A.

(57) ABSTRACT

Disclosed herein are systems and methods for dynamically distributing a safety, awareness task. The systems and methods may include receiving hardware resources data associated with a plurality of remote computing systems. A plurality of safety assurance profiles may be received. Each of the plurality of safety assurance profiles may be associated with a respective service. A safety assurance task may be dynamically assigned to one of the plurality of remote computing systems based on the hardware resources data and one of the plurality of safety assurance profiles.

25 Claims, 9 Drawing Sheets

DYNAMIC SAFETY AWARENESS TASK DISTRIBUTION

FIELD OF THE DISCLOSURE

The present subject matter relates to dynamically distributing safety awareness tasks. Specifically, the present disclosure relates to dynamically distribute safety awareness tasks across multiple computing environments, such as cloud, edge, and device nodes.

BACKGROUND

Distributing tasks statically across an environment is inefficient. For example, by statically distributing a task, resources may be underutilized. In addition, distributing tasks statically may result in expensive resources being used to perform less critical tasks while critical tasks wait to be performed or are not performed at all because resources are not available.

BRIEF DESCRIPTION OF THE FIGURES

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1A:
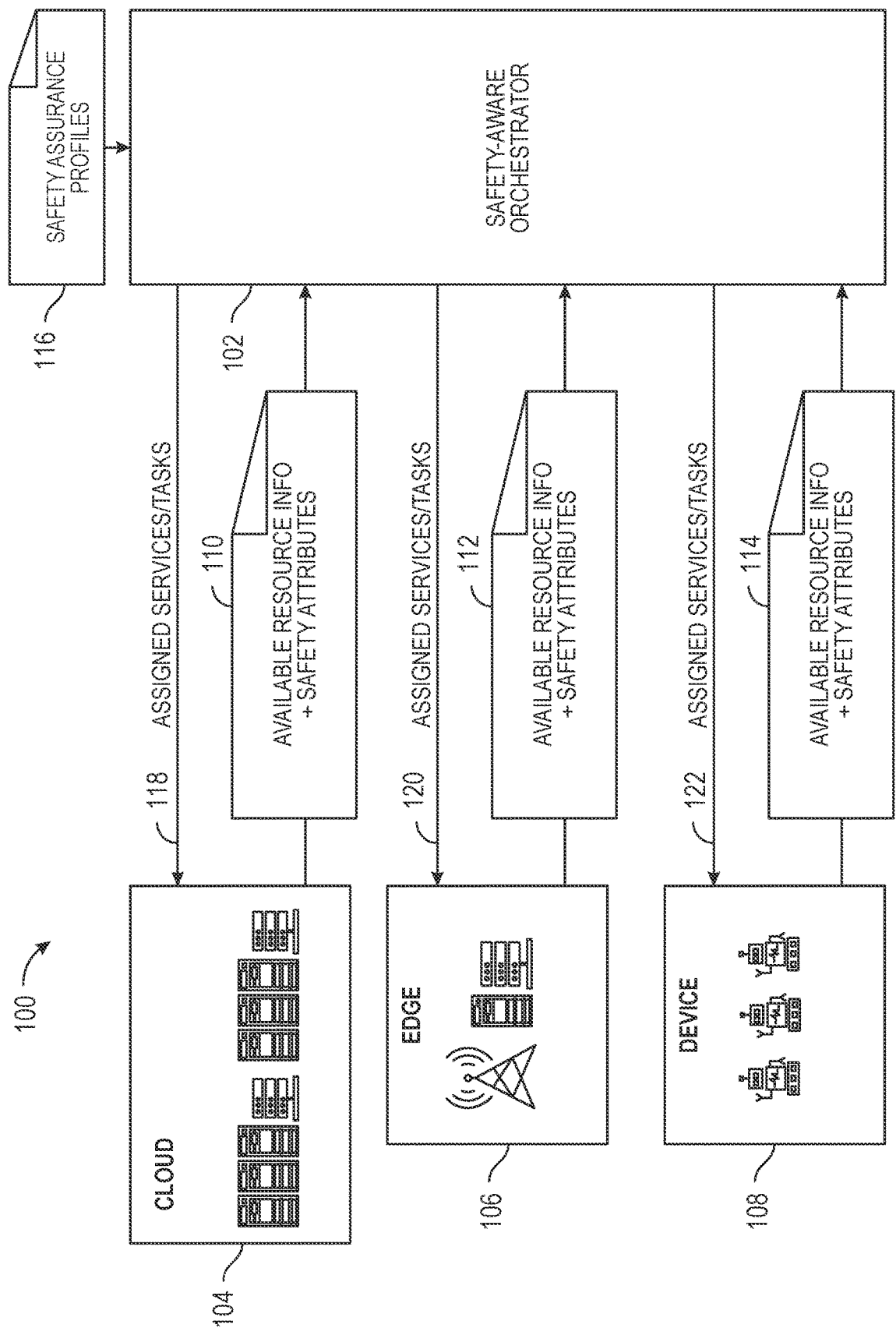
FIGS. 1A and 1B show a system in accordance with at least one example of this disclosure.

As disclosed herein, the end-to-end designs of automated systems, such as robotics systems, may leverage the entire compute continuum (i.e., cloud/edge/device/etc.). Stated another way, the tasks may be dynamically distributed across the continuum to maximize the overall system efficiency. Designs may focusing on the system metrics such as, for example, computational load, power, network bandwidth, latency when distributing the tasks. As disclosed herein, considerations may be made about safety-critical services in this dynamic system optimization context. For safety-critical services, the safety concept may be designed in a static way for a pre-defined underlying platform configuration, where the services can only be running on dedicated hardware resources with a specific set of safety mechanisms. This static and localized design may pose significant constraints to the system efficiency and flexibility, e.g., safety certified hardware resources may need to be sized and reserved to address the worst-case situation, which may lead to significant cost overhead. In addition, upgrading the existing or adding new safety-critical services may not be possible without upgrading the dedicated hardware resources in the system.

As disclosed herein, automated system designs, such as those for robotics systems, may be designed and implemented with run-time dynamic provision and distribution of safety-critical services (and their subtasks) across the entire compute-continuum. The systems and methods disclosed herein, enable such designs, which may be used by designers of automated system designers and operators to optimize the number of safety-critical services running in a cloud-edge-device continuum at a given cost. For example, the optimization may allow for leveraging at least the dynamic nature of the services running in the continuum and the inherent diversity across the continuum, while avoiding the unnecessary overhead caused by worst-case configurations resulted from the state-of-the-art static and isolated safety assurance designs.

The systems and methods disclosed herein may be orthogonal to the many previous works done on safety mechanisms that help a given platform configuration improve its safety level. The systems and methods may be orthogonal in that they may provide a mechanism that can leverage all the existing safety mechanisms designed for static safety assurance in the dynamic setup of cross-continuum distribution of services/tasks with mixed safety levels.

The systems and methods disclosed herein may differ from previous solutions that leverage existing safety mechanisms (e.g., certified hardware and software, redundancy and diversity mechanisms, etc.) in a static and localized way. Static solutions assume that a safety-critical service runs at a pre-defined node (typically on the device node) with a pre-defined hardware and software configuration. During run-time, the service can only run on those dedicated hardware and software resources, including also all the redundant and diverse resources needed locally for the safety assurance.

As will be understood, previous attempts that use static solutions do not support dynamic provisioning and cross-continuum distribution of tasks for safety-critical services like the dynamic systems and methods disclosed herein. Instead, the static systems run with reserved hardware and software resources with local redundancy and diversity if needed, leading to significant cost overhead and inefficient usage of available resources, which may be avoided using the dynamic systems and methods disclosed herein.

The systems and methods disclosed herein address the limitations of static solutions by allowing the dynamic leveraging of diverse resources across the entire compute continuum for safety assurance in new automated system designs. The systems and methods disclosed herein allow for a mechanism that enables run-time dynamic provisioning and distribution of tasks for those safety-critical services across the compute-continuum through a safety-aware orchestrator, thereby allowing for higher flexibility and lower cost compared to existing statically designed safety solutions. The mechanisms may be realized by automatically creating multiple safety assurance profiles for each safety-critical service, such as based on multiple safety concepts with associated safety mechanisms, developed during design phase or deployment phase. Each of the profiles may capture a combination of different types of resources (e.g., hardware and software with different safety certification levels, redundant and diverse resources, etc.) needed to provide safety assurance for particular services based on a new safety-aware orchestrator that has the flexibility to assign services/tasks across the continuum instead of to a pre-defined system node with dedicated resources.

The systems and methods disclosed herein may allow for significant cost-saving potentials through the enabling of dynamic provisioning and distribution of safety-critical services across the continuum. The cost-savings and increased efficiencies may result because the systems and methods disclosed herein enable upgrading existing services and/or adding new safety-critical services without the necessity of upgrading dedicated system (i.e., hardware and/or software) resources. In addition, the large variety of heterogeneous computing resources deployed across the continuum may provide opportunities to achieve diversity and redundancy for safety assurance, which would add significant cost overhead if achieved locally. Furthermore, the utilization of available resources across the continuum may be maximized because no dedicated resources may be needed to be reserved locally for specific safety-critical services. Moreover, the total number of services (with mixed safety levels) may be maximized by scheduling both safety-critical and non-safety-critical services at run-time across the entire continuum.

Figure 1B:
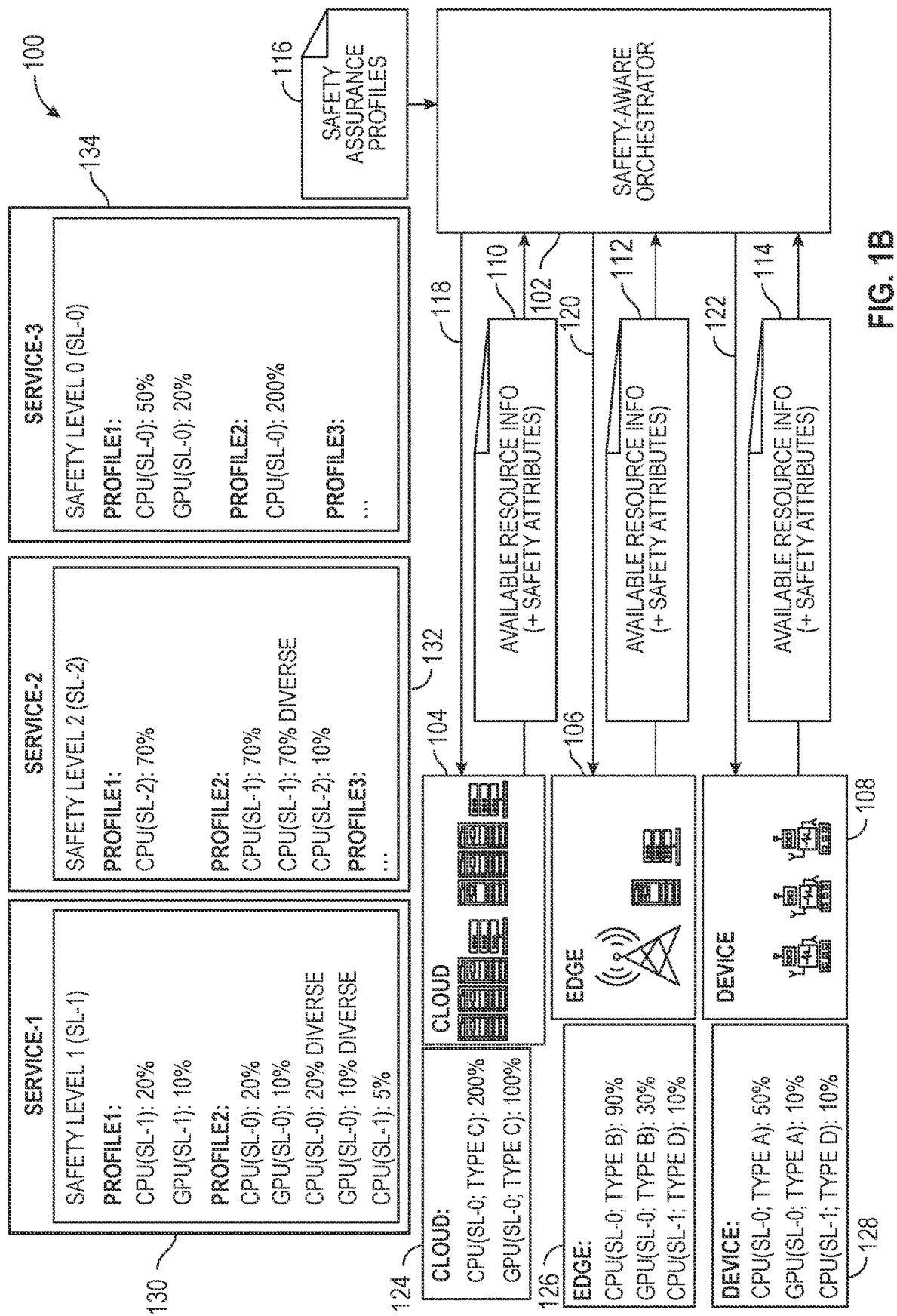

Turning now to the figures. FIGS. 1A and 1B show a system 100 for dynamically distributing safety-critical services in accordance with at least one example of this disclosure. As shown in FIG. 1A, system 100 may include a safety awareness orchestrator 102 that may communicate with a cloud computing system 104, an edge computing system 106, and a device computing system 108. While FIGS. 1A and 1B show a single cloud computing system 104, edge computing system 108, and device computing system 108, embodiments disclosed herein may include any number of cloud, edge, and device computing systems.

As disclosed herein, each of cloud computing system 104, edge computing system 106, and device computing system 108 may resources that may be available for implementing various services. For example, each of cloud computing system 104, edge computing system 106, and device computing system 108 may have a given compute power, bandwidth, memory availability, etc. The exact specifications of the available resources may be shared with safety awareness orchestrator 102 via data exchanges 110, 112, and 114. Data exchanges 110, 112, and 114 may also facilitate the exchange of safety attributes for each of cloud computing system 104, edge computing system 106, and device computing system 108 as disclosed herein. During operation, safety awareness orchestrator 102 may also receive safety assurance profiles 116 for use as disclosed herein. Using the various information safety-awareness orchestrator 102 may assign services/tasks as indicated by reference numbers 118, 120, and 127.

As shown in FIG. 1B, system 100 may each of cloud computing system 104, edge computing system 106, and device computing system 108 may have available resource information and the associated safety attributes as indicate by blocks 124, 126, and 128, respectively. The available resource information and associated safety attributes may be provided by each node in the continuum as a first set of inputs to orchestrator 102. As shown in FIG. 1B, available hardware resources (i.e., cloud computing system 104, edge computing system 106, and device computing system 108) may be tagged with safety level and the type information. In this disclosure only hardware resources are illustrated in the examples for brevity, software resources (e.g., OS, compiler, etc.) may also be considered and used to distribute tasks without departing from the scope of this disclosure.

As disclosed herein, various services may have safety assurance profiles. For example, and as shown in FIG. 1B, a first service may have a safety assurance profile 130, a second service may have a safety assurance profile 132, and a third service may have a safety assurance profile 134. Safety assurance profiles 130, 132, and 134 may be created in an automated manner during system design phase and/or after deployment. For example, during system design a system architect may specify safety levels, CPU performance, CPU distributions, etc. Safety assurance profiles 130, 132, and 134 may be inputs to safety awareness orchestrator 102 as disclosed herein. Safety awareness orchestrator 102 may schedule the services, and any associated tasks with the services, while providing safety assurance based on the required resources specified in a selected safety assurance profile.

Figure 2:
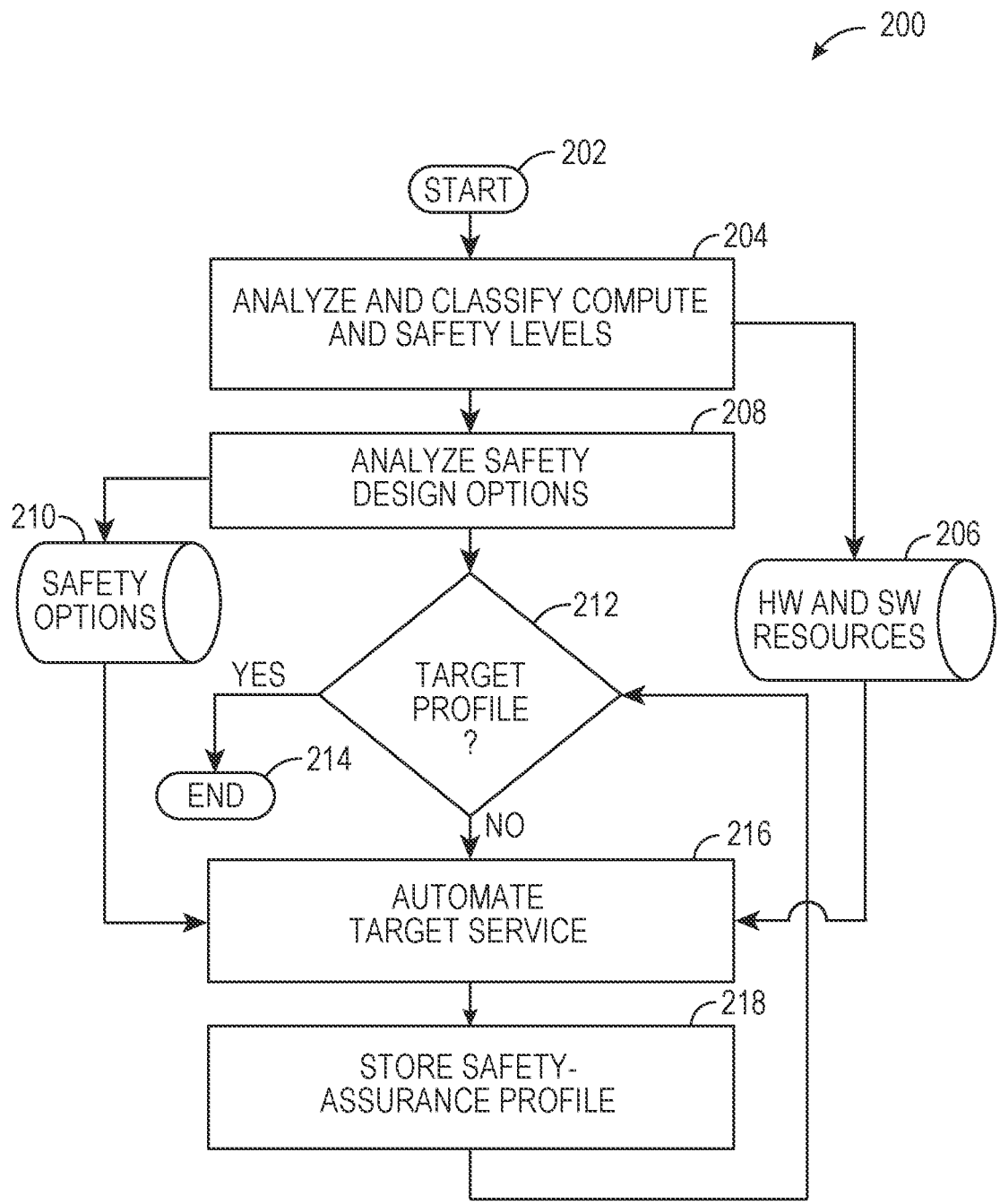
FIG. 2 shows a method in accordance with at least one example of this disclosure.

FIG. 2 shows a method 200 for creating safety assurance profiles, such as safety assurance profiles 116, in accordance with at least one example of this disclosure. Method 200 may include many types of safety-awareness analysis, but FIG. 2 shows two types of analysis and creation of a database with the results. Method 200 may begin at starting block 202 and proceed to stage 304 where compute level and safety level analysis and classification of available hardware and software resources may occur. For example, at stage 202, a computing system, such as computing system 600 described with respect to FIG. 6 below, may receive data that describes the available compute level resources, memory resources, software resources that are available from any of cloud, edge, and device computing systems. Using the various data from each of the computing system, each of the computing systems can be analyzed to determine its capabilities to implement safety level services and classified based on its capabilities. The capabilities and analysis can be saved in a database 206 for later use. For example, with respect to the type of hardware (e.g., Type-A CPU, Type-B GPU, etc.), the computational capability (e.g., as percentage of a normalized value) and the safety class (e.g., safety level 0/1/2 "SL-0/1/2") may be stored in database 206. For the various systems, various safety classes for different types of faults may be considered as well.

From stage 204 method 200 may proceed to stage 208 where safety design options may be analyzed. For example, safety-critical services, which may be decomposed into subtasks, may be analyzed with various safety design options. Non-limiting examples of safety design options may include safety certified hardware and software resources, decomposition by leveraging replication and diversity mechanisms, safety monitoring, etc. The results of the analysis as well as the various design options may be saved in database 210 for later us as disclosed herein.

Non-limiting examples of safety-critical services, at least in the context of automated systems, may include, but are not limited to perception related tasks such as object detection based on camera/lidar/radar input data. Failure in the detection tasks may lead to certain actions (or non-actions) that may cause safety critical consequences. For instance, an example of a non-action may include a robot or a car that does not stop in front of a person because the perception system failed to detect the person. Other examples of safety-critical services may include action control tasks that may decide whether to accelerate, break, turn, etc., which if fail, can cause safety critical consequences and tasks that may generate and present warning signals, which if fail (i.e., no warning when something is wrong), can cause safety critical consequences.

At decision block 212 a determination may be made as to when safety profiling has been complete. If so, method 200 may terminate at termination block 214. If the safety profiling is not complete, method 200 may proceed to stage 216 where a target service may be automated. Automating the target service may include dynamically assigning a safety assurance profile from safety assurance profiles generated using the safety options and hardware and software resource data saved in databases 206 and 210.

As part of the automating of safety-aware profiling, each of the safety design options may be mapped to a set of required compute resources, with associated safety levels, through an automated safety-aware profiling process. For example, iterations that include simulating performance using the safety options stored in database 210 and the hardware and software resources data stored in database 206 can be performed. Part of the iteration process may include scoring each of the permutations to determine which combination of resources best implements the safety options.

The results of the simulations may be recorded as separate safety assurance profiles, such as safety assurance profiles 116, that can be used during the run-time by a safety-awareness orchestrator, such as safety-awareness orchestrator 102. The safety assurance profiles for safety-critical services may be created during the system design phase and may be based on which system design choices are made. And adding new safety-critical services (or new safety assurance profiles) after deployment may also be achieved using method 200.

Figure 3:
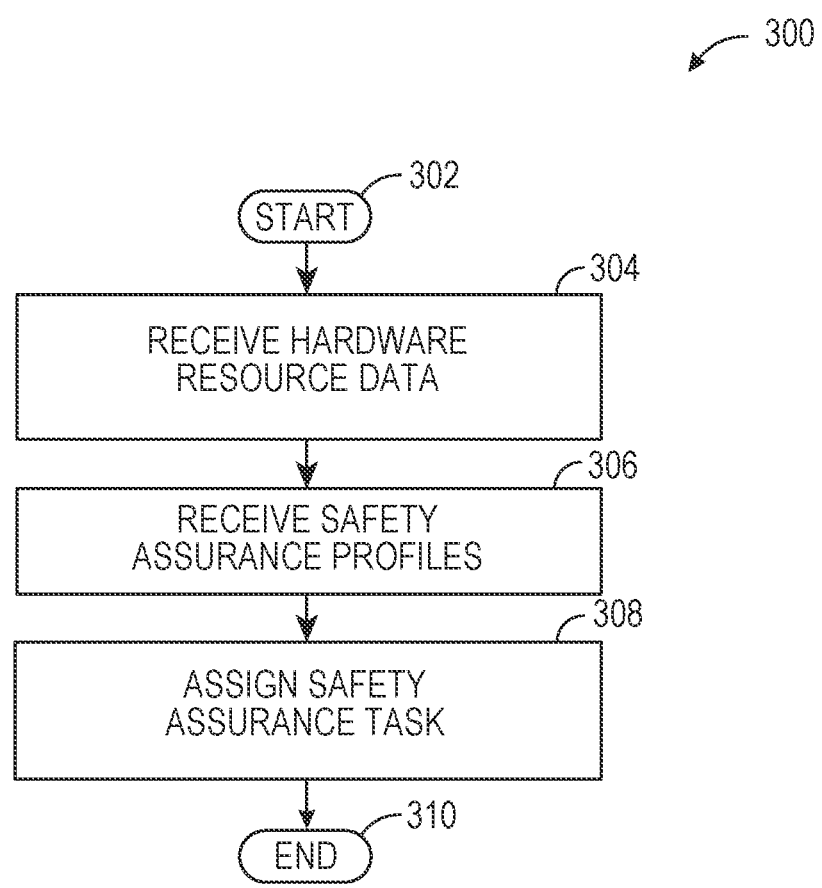
FIG. 3 shows a method in accordance with at least one example of this disclosure.

FIG. 3 shows a method 300 dynamically distributing a safety awareness task in accordance with at least one example of this disclosure. Method 300 may begin at starting block 300 and proceed to stage 302 where hardware resources data may be received by a plurality of remote computing systems, such as cloud computing system 104, edge computing system 106, and device computing system 108. For example, each compute node in the continuum may continuously monitors its available resources and provide the information, including the associated safety attributes, to an orchestrator, such as safety-awareness orchestrator 102. The safety-awareness orchestrator may create and maintain a dynamic inventory of available resources across the continuum with associated safety attributes, based on the run-time inputs from all the compute nodes. For example, using method 200, the orchestrator may create and maintain a dynamic inventory of available resources across the continuum with associated safety attributes, based on the run-time inputs from all the compute nodes.

By using the mapping, either offline or online, of safety design options to the profiles of compute resources with safety attributes, the orchestrator has the flexibility to decide at run-time which profile (i.e., which safety design option) to use for a requested safety-critical service. The orchestrator also has the ability to distribute the service (and its subtasks) in a dynamic and efficient way across the continuum. Stated another way, the orchestrator can receive the safety assurance profiles (304) and dynamically assign tasks (306). For instance, available "SL-0" hardware resources in an edge node may be leveraged to help cover certain "SL-1" services by providing redundancy and diversity that may not be available locally at the device nodes.

The more safety assurance profiles that are available for a service, the more flexibility the orchestrator may have for service and task distributions. Thus, the more safety assurance profiles available, the better the orchestrator may adapt to the dynamically changing conditions. In addition, more safety assurance profiles may allow for more services (both safety-critical and non-safety-critical) to be provided with a given system configuration. Thus, when certain types of resources are not available, alternative task distribution strategy leveraging a different set of safety mechanism can be used instead, without compromising the safety assurance for the service.

Figure 4A:
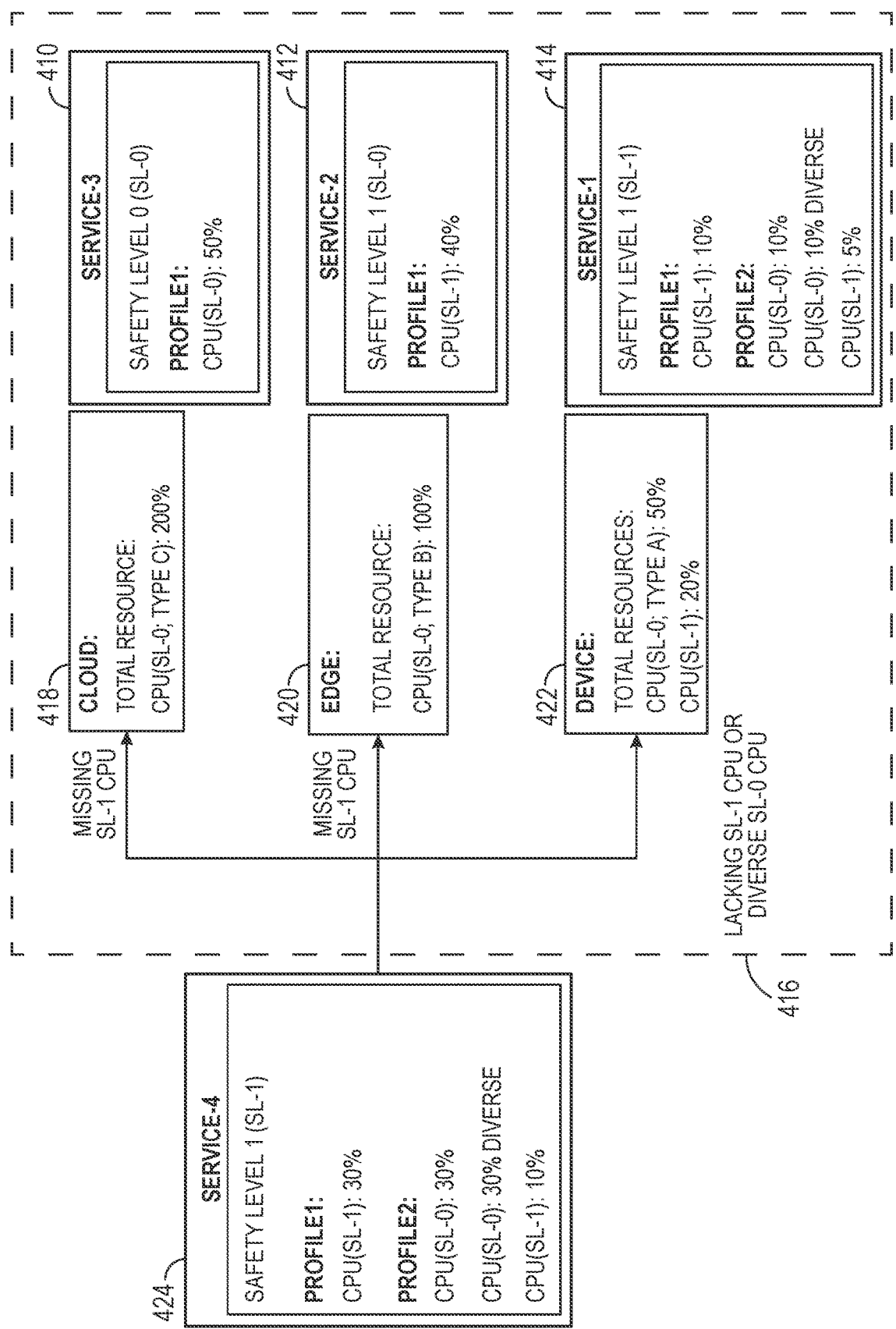
FIGS. 4A and 4B show an example of enabling safety-critical services in accordance with at least one example of this disclosure.
Figure 4B:
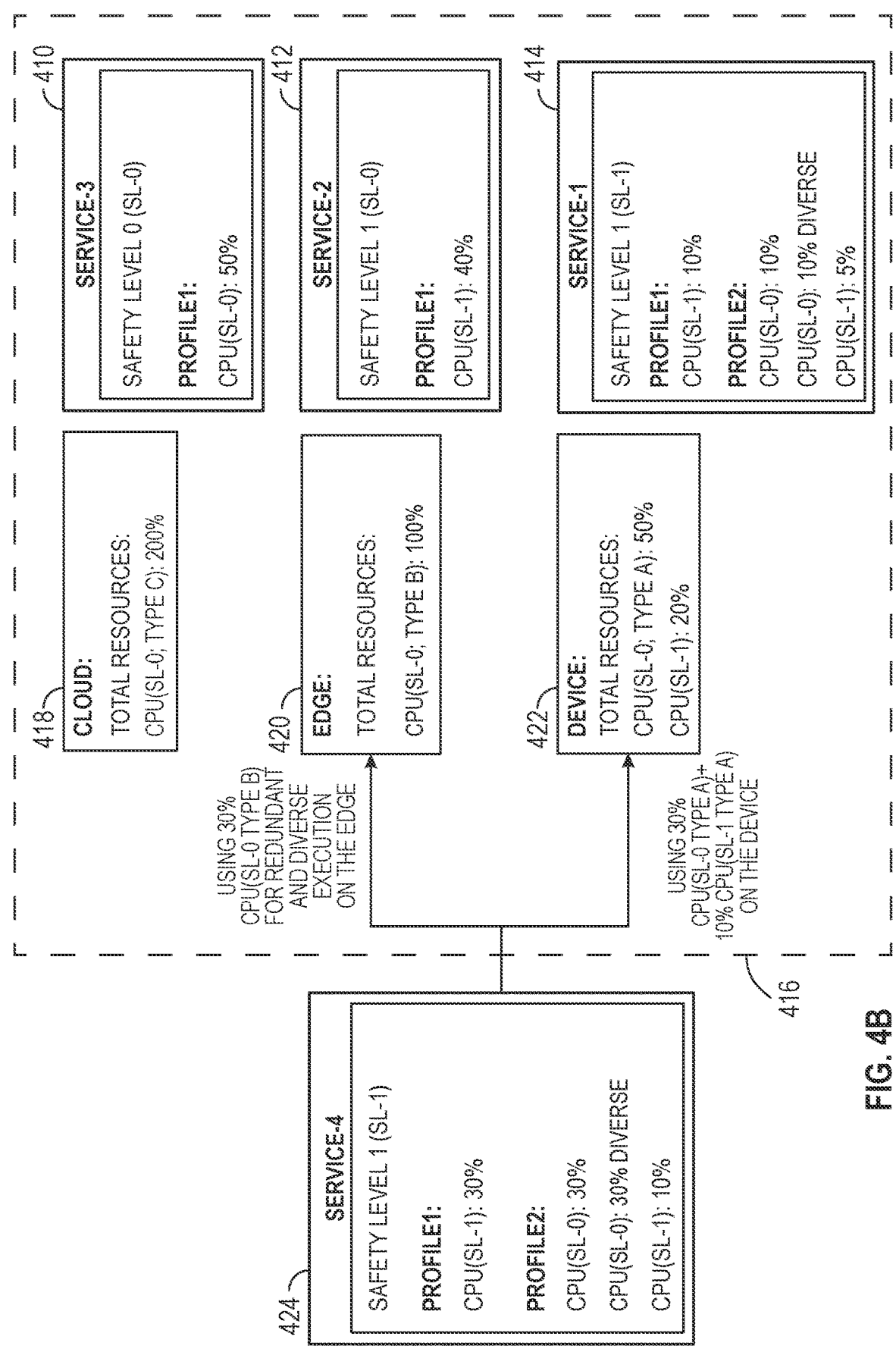

FIGS. 4A and 4B show an example of enabling safety-critical services in accordance with at least one example of this disclosure. In FIG. 4A, an existing automated system, such as a robotics system, with three services 410, 412, 414 may be running on system 416, that may include a cloud node 418, an edge node 420, and a device node 422, with associated safety level and the safety assurance profiles. A fourth (safety-critical) service 424 may need to be added. With a statically designed safety concept, fourth service 424 cannot be added to system 416 as shown in FIG. 4A. Using the systems and methods disclosed herein, it becomes possible to add fourth service 424 by leveraging available diverse resources across system 416.

Figure 5A:
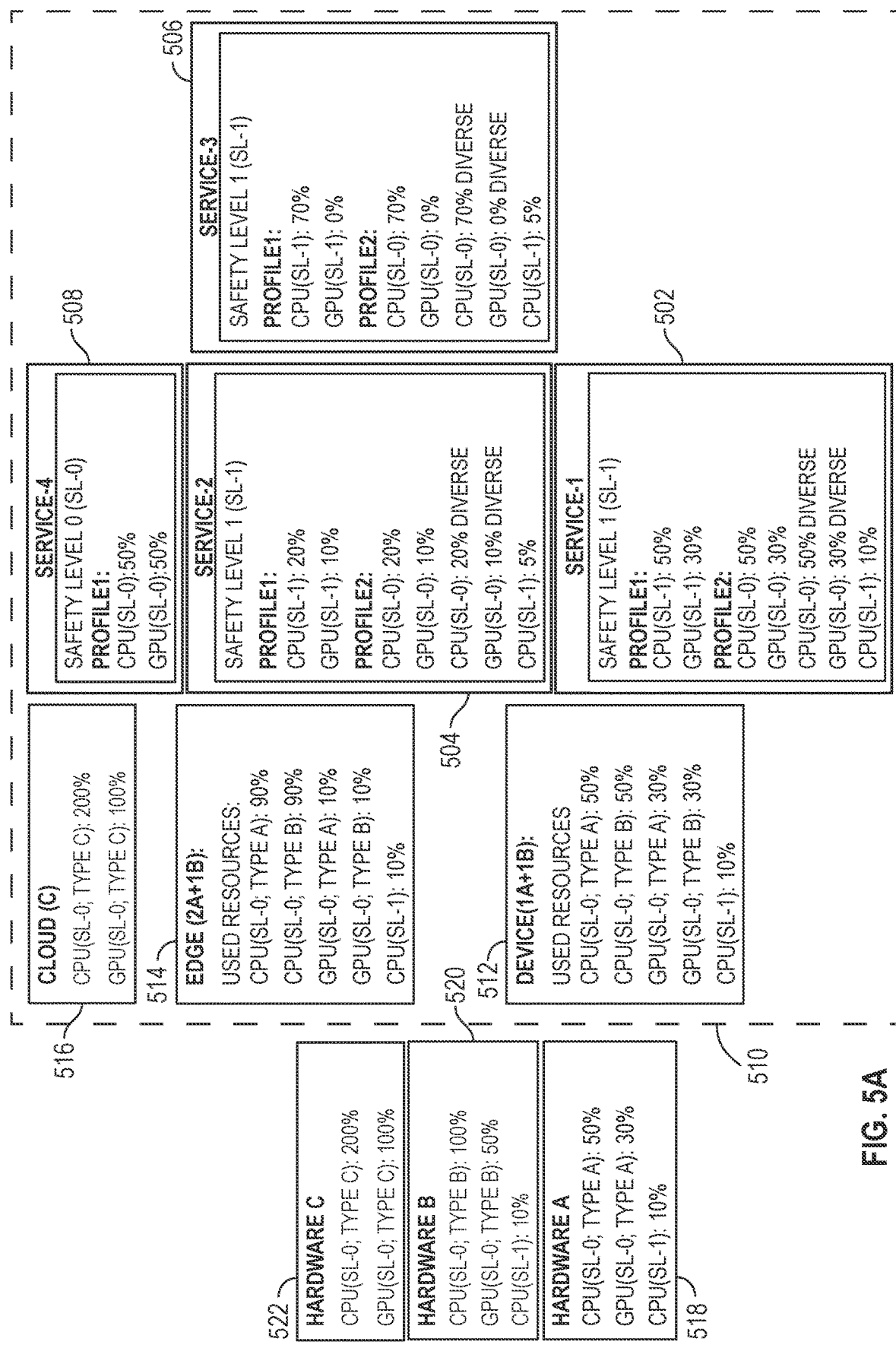
FIGS. 5A and 5B show an example of enabling safety-critical services in accordance with at least one example of this disclosure.
Figure 5B:
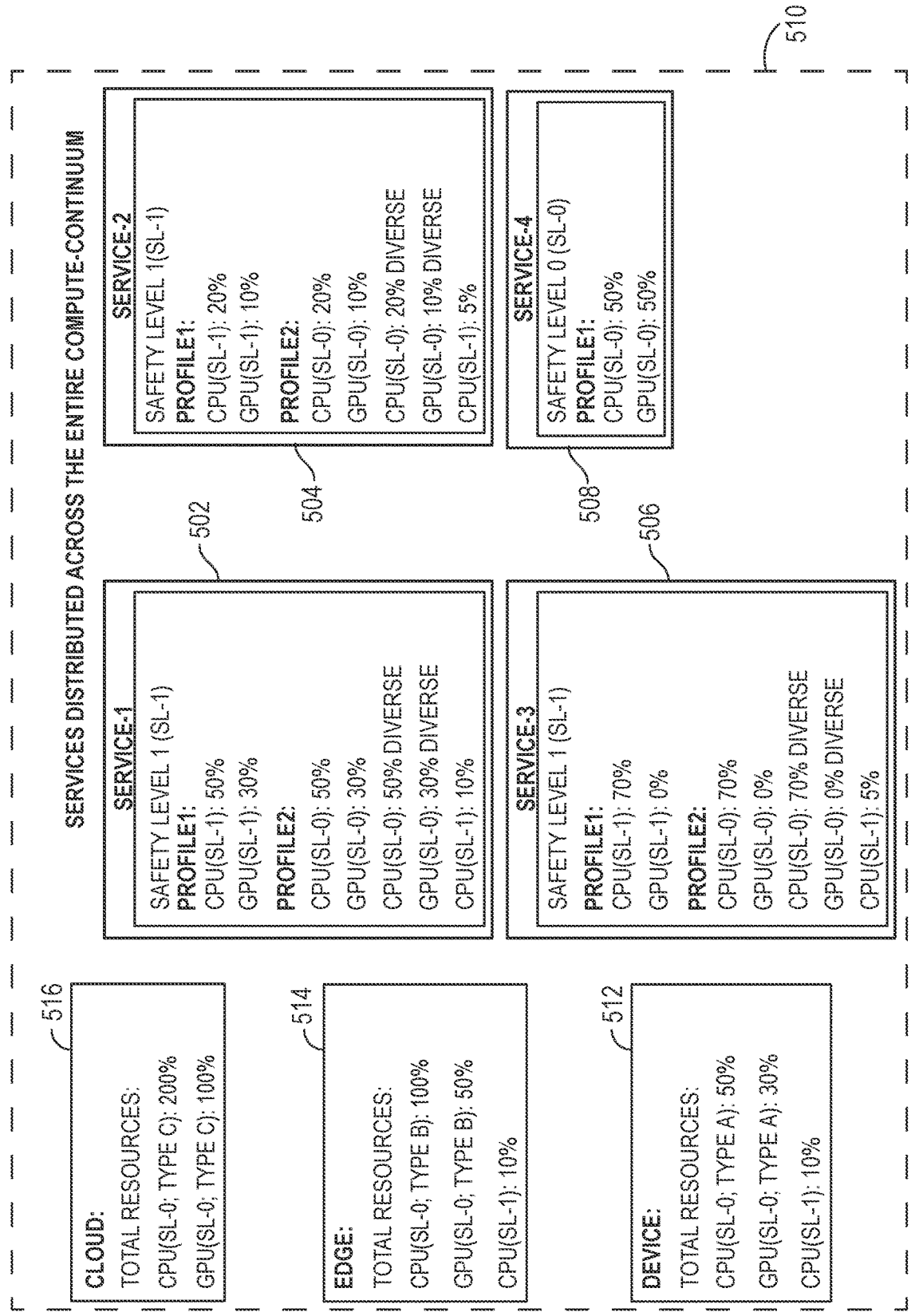

FIGS. 5A and 5B show an analysis that illustrates the cost saving potential of the solutions and methods disclosed herein. In FIG. 5A there are four different services 502, 504, 506, and 508 may have associated safety level and the safety assurance profiles for each service and may need to run in an automated system 510. FIG. 5A shows a static local distribution of services 502, 504, 506, and 508 where service-1 (502) is assigned to a device 512, service-2 (504) and service-3 (506) are assigned to an edge 514, and service-4 (508) is assigned to a cloud 516. Note that in order for device 512 and edge 514 to support the safety-critical services, each node needs to dedicate certain hardware resources to provide the safety assurance. System 510 may include hardware A 518, B 520, and C 522, which may be SoCs, where cloud 516 plans to use hardware C 522 to cover additional SL-0 services. In this case, in order to support all four services, the needed hardware include:

1× Hardware C (cloud)
1× Hardware B+2× Hardware A (edge): using profile2 for both service-2 and 3
1× Hardware A+1× Hardware B (device): using profile2 for service-1
Total: 1×C+2×B+3×A Using the systems and methods disclosed herein, services 502, 504, 506, and 508 may be dynamically distributed across a continuum, such as system 510, which can lead to significant cost saving as illustrated in FIG. 5B. Services 502, 504, 506, and 508 may be distributed as follows (assuming all the latency requirements can be met in this simplistic example):

Service 1 (profile2)
50% CPU to Device+50% CPU diverse to Cloud
30% GPU to Device+30% GPU diverse to Edge
10% SL-1 CPU to Device
Service 2 (profile2)
20% CPU to Edge+20% CPU diverse to Cloud
10% GPU to Edge 10% GPU diverse to Cloud
5% SL-1 CPU to Edge
Service 3 (profile2)
70% CPU to Edge+70% CPU diverse to Cloud
5% SL-1 CPU to Edge
Service 4 (profile1)
50% CPU to Cloud
50% GPU to Cloud The total hardware resource needed in this case is:

1×C (Cloud)
1×B (Edge)
1×A (Device)
Total: 1×C+1×B+1×A

This saves 1×B+2×A hardware compared to the static case. This is achieved by utilizing the diverse resources across the continuum (i.e., system 510) to support the safety-critical services.

The various embodiments disclosed herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the -readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

As used in any embodiment herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

Figure 6:
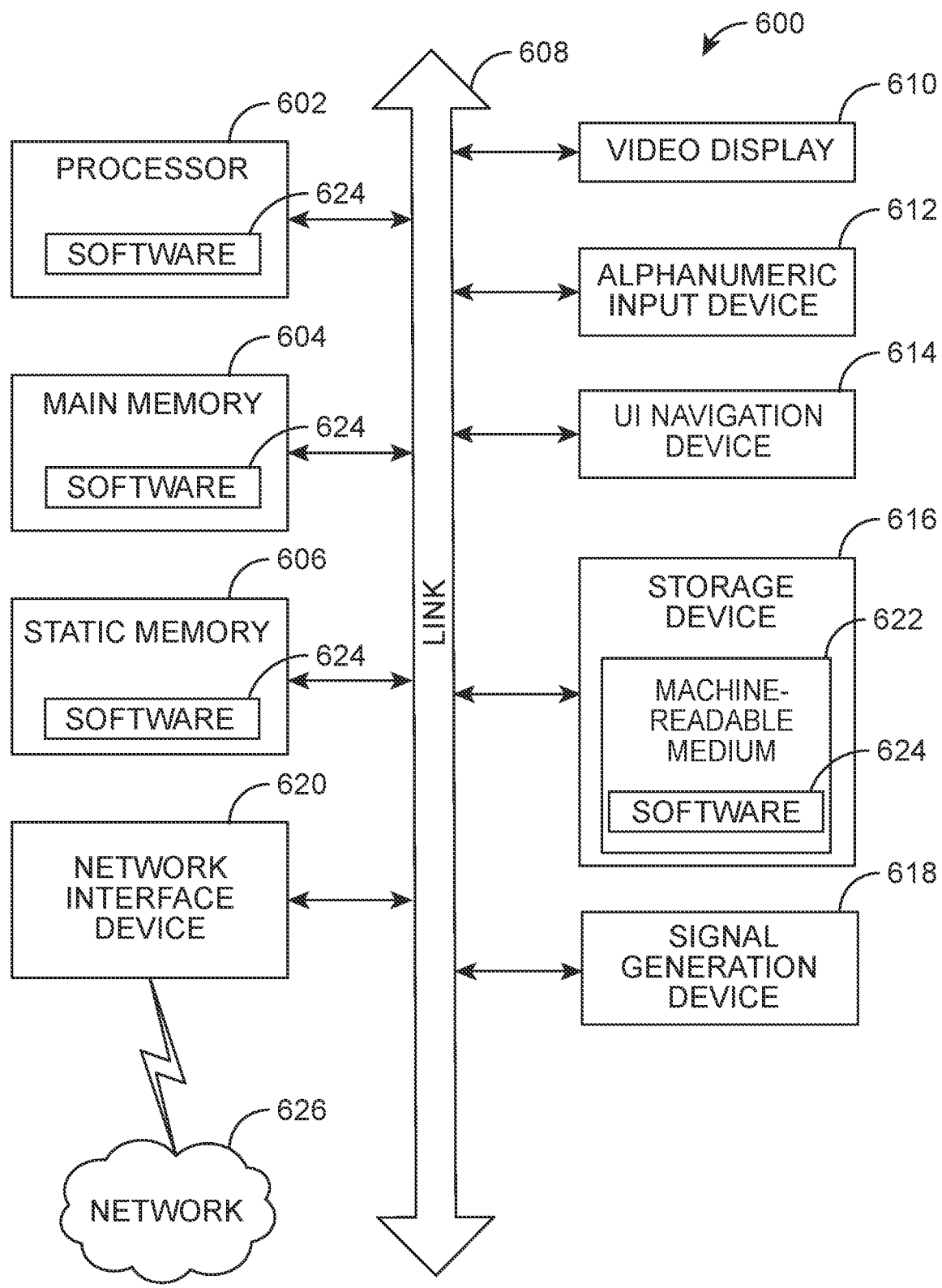
FIG. 6 shows a block diagram illustrating an example machine upon which any one or more of the techniques (e.g., methodologies) discussed herein may perform in accordance with at least one example of this disclosure.

"Circuitry," as used in any embodiment herein, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a system-on-a-chip (SoC) architecture FIG. 6 is a block diagram illustrating a machine in the example form of a computer system 600, such as safety-awareness orchestrator 102, within which a set or sequence of instructions may be executed to cause the machine to perform any one of the methodologies discussed herein, according to an embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a vehicle subsystem, a personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 600 includes at least one processor 602 (e.g., a central processing unit (CPU), a graphics processing unit (GPU) or both, processor cores, compute nodes, etc.), a main memory 604 and a static memory 606, which communicate with each other via a link 608 (e.g., bus). The computer system 600 may further include a video display unit 610, an alphanumeric input device 612 (e.g., a keyboard), and a user interface (UI) navigation device 614 (e.g., a mouse). In one embodiment, the video display unit 610, input device 612 and UI navigation device 614 are incorporated into a touch screen display. The computer system 600 may additionally include a storage device 616 (e.g., a drive unit), a signal generation device 618 (e.g., a speaker), a network interface device 620, and one or more sensors (not shown), such as a global positioning system (GPS) sensor, compass, accelerometer, pyrometer, magnetometer, or other sensor.

The storage device 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, static memory 606, and/or within the processor 602 during execution thereof by the computer system 600, with the main memory 604, static memory 606, and the processor 602 also constituting machine-readable media.

While the machine-readable medium 622 is illustrated in an example embodiment to be a single medium, the term "machine-readable medium" may include a single medium or multiple media e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A, 5G, DSRC, or Satellite (e.g., low-earth orbit) networks). The term "transmission medium" shall be taken to include any intangible medium that is capable of storing, encoding, or carrying instructions for execution by the machine, and includes digital or analog communications signals or other intangible medium to facilitate communication of such software.

Additional Notes

The following, non-limiting examples, detail certain aspects of the present subject matter to solve the challenges and provide the benefits discussed herein, among others.

Example 1 is a system for dynamically distributing a safety awareness task associated with a robotic system, the system comprising: at least one processor; and a memory storing instructions that, when executed by the at least one processor, cause the at least one processor to perform operations comprising: receiving hardware resources data associated with a plurality of remote computing systems capable to complete at least a portion of the safety awareness task, receiving a plurality of safety assurance profiles, each of the plurality of safety assurance profiles associated with a respective service, and dynamically assigning at least a portion of the safety awareness task to at least one of the plurality of remote computing systems based on the hardware resources data and one of the plurality of safety assurance profiles.

In Example 2, the subject matter of Example 1 optionally includes wherein receiving the hardware resources data includes receiving the hardware resources data from a cloud computing system.

In Example 3, the subject matter of any one or more of Examples 1-2 optionally include wherein receiving the hardware resources data includes receiving the hardware resources data from an edge computing device located proximate the robotic system.

In Example 4, the subject matter of any one or more of Examples 1-3 optionally include wherein receiving the hardware resources data includes receiving the hardware resources data from an endpoint device.

In Example 5, the subject matter of any one or more of Examples 1-4 optionally include wherein receiving the hardware resources data includes receiving safety level information from at least one of the remote computing systems.

In Example 6, the subject matter of any one or more of Examples 1-5 optionally include wherein receiving the hardware resources data includes receiving type information from at least one of the remote computing systems.

In Example 7, the subject matter of any one or more of Examples 1-6 optionally include wherein receiving the hardware resources data includes receiving software resources from at least one of the remote computing systems.

In Example 8, the subject matter of any one or more of Examples 1-7 optionally include wherein the operations further comprise generating the plurality of safety assurance profiles.

In Example 9, the subject matter of any one or more of Examples 1-8 optionally include wherein the operations further comprise analyzing safety design options comprising at least one of safety certified hardware and software resources, decomposition by leveraging replication and diversity mechanisms, and safety monitoring.

In Example 10, the subject matter of any one or more of Examples 1-9 optionally include wherein the operations further comprise automating a target service using the one of the plurality of safety assurance profiles.

Example 11 is a system for dynamically distributing a safety awareness task associated with a robotic system, the system comprising: means for receiving hardware resources data associated with a plurality of remote computing systems capable to complete at least a portion of the safety awareness task; means for receiving a plurality of safety assurance profiles, each of the plurality of safety assurance profiles associated with a respective service; and means for dynamically assigning at least a portion of the safety awareness task to at least one of the plurality of remote computing systems based on the hardware resources data and one of the plurality of safety assurance profiles.

In Example 12, the subject matter of Example 11 optionally includes wherein receiving the hardware resources data includes means for receiving the hardware resources data from a cloud computing system.

In Example 13, the subject matter of any one or more of Examples 11-12 optionally include wherein receiving the hardware resources data includes means for receiving the hardware resources data from an edge computing device located proximate the robotic system.

In Example 14, the subject matter of any one or more of Examples 11-13 optionally include wherein receiving the hardware resources data includes means for receiving the hardware resources data from an endpoint device.

In Example 15, the subject matter of any one or more of Examples 11-14 optionally include wherein receiving the hardware resources data includes means for receiving safety level information from at least one of the remote computing systems.

In Example 16, the subject matter of any one or more of Examples 11-15 optionally include wherein receiving the hardware resources data includes means for receiving type information from at least one of the remote computing systems.

In Example 17, the subject matter of any one or more of Examples 11-16 optionally include wherein receiving the hardware resources data includes means for receiving software resources from at least one of the remote computing systems.

In Example 18, the subject matter of any one or more of Examples 11-17 optionally include means for generating the plurality of safety assurance profiles.

In Example 19, the subject matter of any one or more of Examples 11-18 optionally include means for analyzing safety design options comprising at least one of safety certified hardware and software resources, decomposition by leveraging replication and diversity mechanisms, and safety monitoring.

In Example 20, the subject matter of any one or more of Examples 11-19 optionally include means for automating a target service using the one of the plurality of safety assurance profiles.

Example 21 is at least one computer-readable medium, that when executed by at least one processor, causes the at least one processor to perform operations comprising: receiving hardware resources data associated with a plurality of remote computing systems capable to complete at least a portion of a safety awareness task associated with a robotic system; receiving a plurality of safety assurance profiles, each of the plurality of safety assurance profiles associated with a respective service; and dynamically assigning at least a portion of the safety awareness task to at least one of the plurality of remote computing systems based on the hardware resources data and one of the plurality of safety assurance profiles.

In Example 22, the subject matter of Example 21 optionally includes wherein receiving the hardware resources data includes receiving the hardware resources data from a cloud computing system.

In Example 23, the subject matter of any one or more of Examples 21-22 optionally include wherein receiving the hardware resources data includes receiving the hardware resources data from an edge computing device located proximate the robotic system.

In Example 24, the subject matter of any one or more of Examples 21-23 optionally include wherein receiving the hardware resources data includes receiving the hardware resources data from an endpoint device.

In Example 25, the subject matter of any one or more of Examples 21-24 optionally include wherein receiving the hardware resources data includes receiving safety level information from at least one of the remote computing systems.

In Example 26, the subject matter of any one or more of Examples 21-25 optionally include wherein receiving the hardware resources data includes receiving type information from at least one of the remote computing systems.

In Example 27, the subject matter of any one or more of Examples 21-26 optionally include wherein receiving the hardware resources data includes receiving software resources from at least one of the remote computing systems.

In Example 28, the subject matter of any one or more of Examples 21-27 optionally include wherein the operations further comprise generating the plurality of safety assurance profiles.

In Example 29, the subject matter of any one or more of Examples 21-28 optionally include wherein the operations further comprise analyzing safety design options comprising at least one of safety certified hardware and software resources, decomposition by leveraging replication and diversity mechanisms, and safety monitoring.

In Example 30, the subject matter of any one or more of Examples 21-29 optionally include wherein the operations further comprise automating a target service using the one of the plurality of safety assurance profiles.

Example 31 is a method for dynamically distributing a safety awareness task associated with a robotic system, the method comprising: receiving hardware resources data associated with a plurality of remote computing systems capable to complete at least a portion of the safety awareness task; receiving a plurality of safety assurance profiles, each of the plurality of safety assurance profiles associated with a respective service; and dynamically assigning at least a portion of the safety awareness task to at least one of the plurality of remote computing systems based on the hardware resources data and one of the plurality of safety assurance profiles.

In Example 32, the subject matter of Example 31 optionally includes wherein receiving the hardware resources data includes receiving the hardware resources data from a cloud computing system.

In Example 33, the subject matter of any one or more of Examples 31-32 optionally include wherein receiving the hardware resources data includes receiving the hardware resources data from an edge computing device located proximate the robotic system.

In Example 34, the subject matter of any one or more of Examples 31-33 optionally include wherein receiving the hardware resources data includes receiving the hardware resources data from an endpoint device.

In Example 35, the subject matter of any one or more of Examples 31-34 optionally include wherein receiving the hardware resources data includes receiving safety level information from at least one of the remote computing systems.

In Example 36, the subject matter of any one or more of Examples 31-35 optionally include wherein receiving the hardware resources data includes receiving type information from at least one of the remote computing systems.

In Example 37, the subject matter of any one or more of Examples 31-36 optionally include wherein receiving the hardware resources data includes receiving software resources from at least one of the remote computing systems.

In Example 38, the subject matter of any one or more of Examples 31-37 optionally include wherein the operations further comprise generating the plurality of safety assurance profiles.

In Example 39, the subject matter of any one or more of Examples 31-38 optionally include wherein the operations further comprise analyzing safety design options comprising at least one of safety certified hardware and software resources, decomposition by leveraging replication and diversity mechanisms, and safety monitoring.

In Example 40, the subject matter of any one or more of Examples 31-39 optionally include wherein the operations further comprise automating a target service using the one of the plurality of safety assurance profiles.

Example 41 is at least one computer-readable medium comprising instructions to perform any of the methods of Examples 31-40.

Example 42 is an apparatus comprising means for performing any of the methods of Examples 31-40.

Example 43 is a system for generating a plurality of safety assurance profiles, the system comprising: at least one processor; and a memory storing instructions that, when executed by the at least one processor, cause the at least one processor to perform operations comprising: classifying multiple compute levels and multiple safety levels, each of the multiple compute levels and the multiple safety levels associated with one of a plurality of computing systems and a capability to perform safety awareness tasks, determining a capability of each of the plurality of computing systems to execute each of a plurality of design options for implementing the safety awareness tasks based on a classification of each of the multiple compute levels and the multiple safety levels, and generating the plurality of safety assurance profiles for each of the plurality of computing systems based on the determined capability of each of the plurality of computing systems to execute each of the plurality of design options.

In Example 44, the subject matter of Example 43 optionally includes wherein determining the capability of each of the plurality of computing systems to execute each of the plurality of design options comprises determining the capability of each of the plurality of computing systems to perform one or more subtasks of at least one of the safety awareness tasks.

In Example 45, the subject matter of any one or more of Examples 43-44 optionally include wherein the operations further comprise storing the plurality of safety assurance profiles to a database.

In Example 46, the subject matter of any one or more of Examples 43-45 optionally include wherein the operations further comprise receiving the compute and safety levels from the plurality of computing systems.

In Example 47, the subject matter of any one or more of Examples 43-46 optionally include wherein the operations further comprise receiving the compute and safety levels from a cloud computing system.

In Example 48, the subject matter of Example undefined optionally includes, wherein the operations further comprise receiving the compute and safety levels from an edge computing de vice located proximate an autonomous system.

In Example 49, the subject matter of any one or more of Examples 43-48 optionally include wherein the operations further comprise receiving the compute and safety levels from an endpoint device.

Example 50 is a system for generating a plurality of safety assurance profiles, the system comprising: means for classifying multiple compute levels and multiple safety levels, each of the multiple compute levels and the multiple safety levels associated with one of a plurality of computing systems and a capability to perform safety awareness tasks, means for determining a capability of each of the plurality of computing systems to execute each of a plurality of design options for implementing the safety awareness tasks based on a classification of each of the multiple compute levels and the multiple safety levels, and means for generating the plurality of safety assurance profiles for each of the plurality of computing systems based on the determined capability of each of the plurality of computing systems to execute each of the plurality of design options.

In Example 51, the subject matter of Example 50 optionally includes wherein determining the capability of each of the plurality of computing systems to execute each of the plurality of design options comprises means for determining the capability of each of the plurality of computing systems to perform one or more subtasks of at least one of the safety awareness tasks.

In Example 52, the subject matter of any one or more of Examples 50-51 optionally include means for storing the plurality of safety assurance profiles to a database.

In Example 53, the subject matter of any one or more of Examples 50-52 optionally include means for receiving the compute and safety levels from the plurality of computing systems.

In Example 54, the subject matter of any one or more of Examples 50-53 optionally include means for receiving the compute and safety levels from a cloud computing system.

In Example 55, the subject matter of Example undefined optionally includes further comprising means for receiving the compute and safety levels from an edge computing device located proximate an autonomous system.

In Example 56, the subject matter of Example undefined optionally includes, further comprising means for receiving the compute and safety levels from an endpoint device.

Example 57 is at least one computer-readable medium that, when executed by at least one processor, causes the at least one process to perform operations comprising: classifying multiple compute levels and multiple safety levels, each of the multiple compute levels and the multiple safety levels associated with one of a plurality of computing systems and a capability to perform safety awareness tasks; determining a capability of each of a plurality of computing systems to execute each of a plurality of design options for implementing the safety awareness tasks based on a classification of each of the multiple compute levels and the multiple safety levels; and generating the plurality of safety assurance profiles for each of the plurality of computing systems based on the determined capability of each of the plurality of computing systems to execute each of the plurality of design options.

In Example 58, the subject matter of Example 57 optionally includes wherein determining the capability of each of the plurality of computing systems to execute each of the plurality of design options comprises determining the capability of each of the plurality of computing systems to perform one or more subtasks of at least one of the safety awareness tasks.

In Example 59, the subject matter of any one or more of Examples 57-58 optionally include wherein the operations further comprise storing the plurality of safety assurance profiles to a database.

In Example 60, the subject matter of any one or more of Examples 57-59 optionally include wherein the operations further comprise receiving the compute and safety levels from the plurality of computing systems.

In Example 61, the subject matter of any one or more of Examples 57-60 optionally include wherein the operations further comprise receiving the compute and safety levels from a cloud computing system.

In Example 62, the subject matter of any one or more of Examples 57-61 optionally include wherein the operations further comprise receiving the compute and safety levels from an edge computing device located proximate an autonomous system.

In Example 63, the subject matter of any one or more of Examples 57-62 optionally include wherein the operations further comprise receiving the compute and safety levels from an endpoint device.

Example 64 is a method for generating a plurality of safety assurance profiles, the method comprising: classifying multiple compute levels and multiple safety levels, each of the multiple compute levels and the multiple safety levels associated with one of a plurality of computing systems and a capability to perform safety awareness tasks; determining a capability of each of the plurality of computing systems to execute each of a plurality of design options for implementing the safety awareness tasks based on a classification of each of the multiple compute levels and the multiple safety levels; and generating the plurality of safety assurance profiles for each of the plurality of computing systems based on the determined capability of each of the plurality of computing systems to execute each of the plurality of design options.

In Example 65, the subject matter of Example 64 optionally includes wherein determining the capability of each of the plurality of computing systems to execute each of the plurality of design options comprises determining the capability of each of the plurality of computing systems to perform one or more subtasks of at least one of the safety awareness tasks.

In Example 66, the subject matter of any one or more of Examples 64-65 optionally include wherein the operations further comprise storing the plurality of safety assurance profiles to a database.

In Example 67, the subject matter of any one or more of Examples 64-66 optionally include wherein the operations further comprise receiving the compute and safety levels from the plurality of computing systems.

In Example 68, the subject matter of any one or more of Examples 64-67 optionally, include wherein the operations further comprise receiving the compute and safety levels from a cloud computing system.

In Example 69, the subject matter of any one or more of Examples 64-68 optionally include wherein the operations further comprise receiving the compute and safety levels from an edge computing device located proximate an autonomous system.

In Example 70, the subject matter of any one or more of Examples 64-69 optionally include wherein the operations further comprise receiving the compute and safety levels from an endpoint device.

Example 71 is at least one computer-readable medium comprising instructions to perform any of the methods of Examples 64-70.

Example 72 is an apparatus comprising means for performing any of the methods of Examples 64-70.

In Example 73, the systems, computer-readable mediums, apparatuses and/or method of any one or any combination of Examples 1-72 can optionally be configured such that all elements or options recited are available to use or select from.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not. A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A system for dynamically distributing a safety awareness task associated with a robotic system, the system comprising:
   at least one processor; and
   a memory storing instructions that, when executed by the at least one processor, cause the at least one processor to perform operations comprising:
      receiving hardware resources data associated with a plurality of remote computing systems, the resources data identifying available hardware resources of the remote computing systems capable to complete at least a portion of the safety awareness task,
      obtaining a plurality of safety assurance profiles, each of the plurality of safety assurance profiles associated with a respective service of a plurality of services,
      dynamically assigning at least a portion of the safety awareness task to at least one of the plurality of remote computing systems based on the hardware resources data and a selected one of the plurality of safety assurance profiles, and
      automating a target service of the plurality of services using the selected one of the plurality of safety assurance profiles, wherein the selected one of the plurality of safety assurance profiles maps a set of required compute resources to safety design options associated with the available hardware resources, to implement a safety level for tasks performed for the robotic system with the target service.

2. The system of claim 1, wherein receiving the hardware resources data includes receiving the hardware resources data from a cloud computing system.

3. The system of claim 1, wherein receiving the hardware resources data includes receiving the hardware resources data from an edge computing device located proximate to the robotic system.

4. The system of claim 1, wherein receiving the hardware resources data includes receiving the hardware resources data from an endpoint device.

5. The system of claim 1, wherein receiving the hardware resources data includes receiving safety level information from at least one of the remote computing systems.

6. The system of claim 1, wherein receiving the hardware resources data includes receiving type information from at least one of the remote computing systems.

7. The system of claim 1, wherein receiving the hardware resources data includes receiving software resources from at least one of the remote computing systems.

8. The system of claim 1, wherein obtaining the plurality of safety assurance profiles comprises generating the plurality of safety assurance profiles.

9. The system of claim 1, wherein the operations further comprise analyzing the safety design options, the safety design options comprising at least one of safety certified hardware and software resources, decomposition by leveraging replication and diversity mechanisms, and safety monitoring.

10. A system for dynamically distributing a safety awareness task associated with a robotic system, the system comprising:
    means for receiving hardware resources data associated with a plurality of remote computing systems, the resources data identifying available hardware resources of the remote computing systems capable to complete at least a portion of the safety awareness task;
    means for obtaining a plurality of safety assurance profiles, each of the plurality of safety assurance profiles associated with a respective service of a plurality of services;
    means for dynamically assigning at least a portion of the safety awareness task to at least one of the plurality of remote computing systems based on the hardware resources data and a selected one of the plurality of safety assurance profiles; and
    means for automating a target service of the plurality of services using the selected one of the plurality of safety assurance profiles, wherein the selected one of the plurality of safety assurance profiles maps a set of required compute resources to safety design options associated with the available hardware resources, to implement a safety level for tasks performed for the robotic system with the target service.

11. The system of claim 10, wherein the means for receiving the hardware resources data includes means for receiving the hardware resources data from a cloud computing system.

12. The system of claim 10, wherein the means for receiving the hardware resources data includes means for receiving the hardware resources data from an edge computing device located proximate to the robotic system.

13. The system of claim 10, wherein the means for receiving the hardware resources data includes means for receiving the hardware resources data from an endpoint device.

14. The system of claim 10, wherein the means for receiving the hardware resources data includes means for receiving safety level information from at least one of the remote computing systems.

15. The system of claim 10, wherein the means for receiving the hardware resources data includes means for receiving type information from at least one of the remote computing systems.

16. The system of claim 10, wherein the means for receiving the hardware resources data includes means for receiving software resources from at least one of the remote computing systems.

17. The system of claim 10, wherein the means for obtaining the plurality of safety assurance profiles includes means for generating the plurality of safety assurance profiles.

18. The system of claim 10, further comprising means for analyzing the safety design options, the safety design options comprising at least one of safety certified hardware and software resources, decomposition by leveraging replication and diversity mechanisms, and safety monitoring.

19. At least one non-transitory computer-readable medium comprising instructions, that when executed by at least one processor, causes the at least one processor to perform operations comprising:
    receiving hardware resources data associated with a plurality of remote computing systems, the resources data identifying available hardware resources of the remote computing systems capable to complete at least a portion of a safety awareness task associated with a robotic system;
    obtaining a plurality of safety assurance profiles, each of the plurality of safety assurance profiles associated with a respective service of a plurality of services;
    dynamically assigning at least a portion of the safety awareness task to at least one of the plurality of remote computing systems based on the hardware resources data and a selected one of the plurality of safety assurance profiles; and automating a target service of the plurality of services using the selected one of the plurality of safety assurance profiles, wherein the selected one of the plurality of safety assurance profiles maps a set of required compute resources to safety design options associated with the available hardware resources, to implement safety level for tasks performed for the robotic system with the target service.

20. The at least one computer-readable medium of claim 19, wherein receiving the hardware resources data includes receiving the hardware resources data from a cloud computing system.

21. The at least one computer-readable medium of claim 19, wherein receiving the hardware resources data includes receiving the hardware resources data from an edge computing device located proximate to the robotic system.

22. The at least one computer-readable medium of claim 19, wherein receiving the hardware resources data includes receiving the hardware resources data from an endpoint device.

23. The at least one computer-readable medium of claim 19, wherein receiving the hardware resources data includes receiving safety level information from at least one of the remote computing systems.

24. The at least one computer-readable medium of claim 19, wherein obtaining the plurality of safety assurance profiles comprises generating the plurality of safety assurance profiles.

25. The at least one computer-readable medium of claim 19, wherein the operations further comprise analyzing the safety design options, the safety design options comprising at least one of safety certified hardware and software resources, decomposition by leveraging replication and diversity mechanisms, and safety monitoring.

* * * * *